United States Patent
Araki et al.

(10) Patent No.: US 10,083,185 B2
(45) Date of Patent: Sep. 25, 2018

(54) ENHANCED DATA REPLICATION

(71) Applicant: International Business Machines Corporation, Armonk, NY (US)

(72) Inventors: Hiroshi Araki, Yokohama (JP); Shah Mohammad Rezaul Islam, Tucson, AZ (US); Hiroyuki Miyoshi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 14/936,204

(22) Filed: Nov. 9, 2015

(65) Prior Publication Data

US 2017/0132223 A1     May 11, 2017

(51) Int. Cl.
*G06F 17/30*     (2006.01)

(52) U.S. Cl.
CPC .... *G06F 17/3023* (2013.01); *G06F 17/30212* (2013.01)

(58) Field of Classification Search
CPC .................................. G06F 17/30575
See application file for complete search history.

(56) References Cited

U.S. PATENT DOCUMENTS

| | | | |
|---|---|---|---|
| 8,275,782 B2 | 9/2012 | Hirsch et al. | |
| 2007/0288533 A1* | 12/2007 | Srivastava | ........ G06F 17/30215 |
| 2012/0269354 A1* | 10/2012 | Doherty | ................ G10L 19/005 |
| | | | 381/56 |
| 2014/0181040 A1 | 6/2014 | Montulli et al. | |
| 2014/0229452 A1 | 8/2014 | Serita et al. | |
| 2016/0078327 A1* | 3/2016 | Wakamatsu | ............ G06F 11/36 |
| | | | 358/1.15 |

OTHER PUBLICATIONS

Constantinescu, C.; "Compression for data archiving and backup revisited"; Proceedings of the SPIE—The International Society for Optical Engineering, vol. 7444, 7444oC (12 pp.), 2009.
Constantinescu, C.; "Block size optimization in de-duplication systems"; 2009 Data Compression Conference, DCC 2009, 442. IEEE; 2009.
Linux Defenders et al.; "Scalable Data De-duplication using Similarity Matching and in-memory indexes"; An IP.com Prior Art Database Technical Disclosure; http://ip.com/IPCOM/000226554; Apr. 16, 2013.

* cited by examiner

*Primary Examiner* — Hung Q Pham
(74) *Attorney, Agent, or Firm* — Kunzler, PC

(57) ABSTRACT

An apparatus, method, system, and program product are disclosed for data replication. One method includes determining a predicted match ratio. The predicted match ratio may predict a percentage of a current version of a file that matches a prior version of the file. The method may include performing a delta transfer if the predicted match ratio is greater than a predetermined threshold. The delta transfer may transfer a portion of the current version of the file that has changed relative to the prior version of the file. The method may include performing a transfer of the current version of the file if the predicted match ratio is less than the predetermined threshold.

20 Claims, 4 Drawing Sheets

ENHANCED DATA REPLICATION

FIELD

The subject matter disclosed herein relates to data replication and more particularly relates to enhanced data replication.

BACKGROUND

Data replication or data backups may be used to replicate data such that a backup of the data is maintained to aid in data recovery.

BRIEF SUMMARY

An apparatus for data replication is disclosed. A method and computer program product also perform the functions of the apparatus. In one embodiment, an apparatus includes a match ratio prediction module that determines a predicted match ratio. In certain embodiments, the predicted match ratio predicts a percentage of a current version of a file that matches a prior version of the file. The apparatus, in a further embodiment, includes a delta transfer module that performs a delta transfer if the predicted match ratio is greater than a predetermined threshold. In some embodiments, the delta transfer transfers a portion of the current version of the file that has changed relative to the prior version of the file. In various embodiment, the apparatus includes a transfer module that performs a transfer of the current version of the file if the predicted match ratio is less than the predetermined threshold. In one embodiment, the transfer transfers the entire current version of the file. In certain embodiments, at least a portion of the match ratio prediction module, the delta transfer module, and the transfer module includes one or more of hardware and executable code. The executable code may be stored on one or more computer readable storage media.

A method for data replication, in one embodiment, includes determining a predicted match ratio. In various embodiments, the predicted match ratio predicts a percentage of a current version of a file that matches a prior version of the file. The method may also include performing a delta transfer if the predicted match ratio is greater than a predetermined threshold. In one embodiment, the delta transfer transfers a portion of the current version of the file that has changed relative to the prior version of the file. The method may include performing a transfer of the current version of the file if the predicted match ratio is less than the predetermined threshold. In certain embodiments, the transfer transfers the entire current version of the file.

In one embodiment, a computer program product for data replication includes a computer readable storage medium having program instructions embodied therewith. The program instructions, in one embodiment, are executable by a processor to cause the processor to determine a predicted match ratio. In various embodiments, the predicted match ratio predicts a percentage of a current version of a file that matches a prior version of the file. In a further embodiment, the program instructions are executable by a processor to cause the processor to perform a delta transfer if the predicted match ratio is greater than a predetermined threshold. In one embodiment, the delta transfer transfers a portion of the current version of the file that has changed relative to the prior version of the file. In certain embodiments, the program instructions are executable by a processor to cause the processor to perform a transfer of the current version of the file if the predicted match ratio is less than the predetermined threshold. In some embodiments, the transfer transfers the entire current version of the file.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
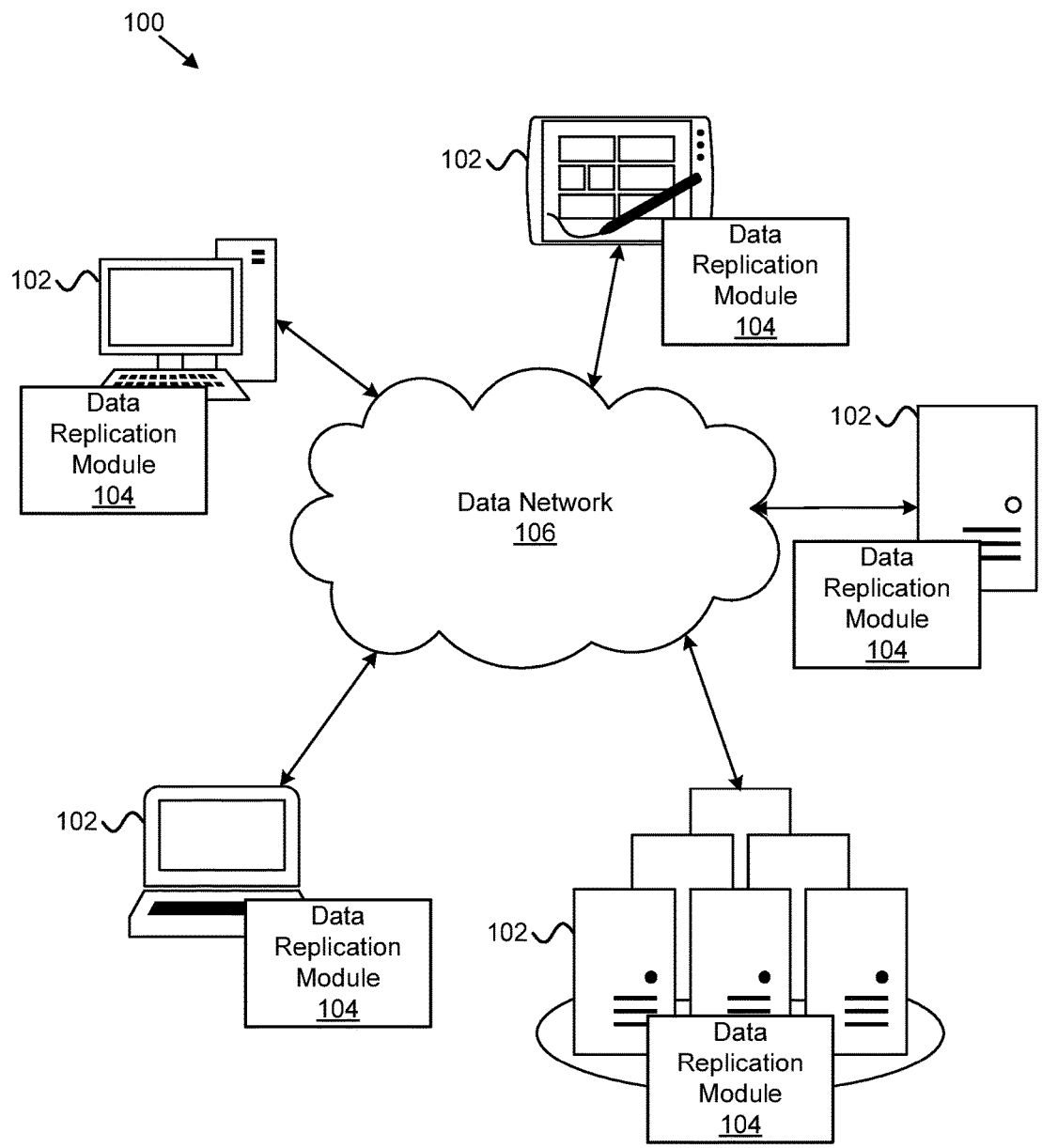
FIG. 1 is a schematic block diagram illustrating one embodiment of a system for data replication in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment,""in an embodiment," and similar language throughout this specification may, but do not necessarily, all refer to the same embodiment, but mean "one or more but not all embodiments" unless expressly specified otherwise. The terms "including,""comprising,""having," and variations thereof mean "including but not limited to" unless expressly specified otherwise. An enumerated listing of items does not imply that any or all of the items are mutually exclusive and/or mutually inclusive, unless expressly specified otherwise. The terms "a,""an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1 depicts one embodiment of a system 100 for data replication. In one embodiment, the system 100 includes information handling devices 102, data replication modules 104, and data networks 106. Even though a particular number of information handling devices 102, data replication modules 104, and data networks 106 are depicted in the system 100 of FIG. 1, one of skill in the art will recognize that any number or configuration of information handling devices 102, data replication modules 104, and data networks 106 may be present in the system 100.

The information handling devices 102, in certain embodiments, include computing devices, such as desktop computers, laptop computers, tablet computers, smart phones, smart televisions, or the like. The information handling devices 102 may also include servers, such as web servers, application servers, file servers, media servers, email servers, cloud servers, backup servers, virtual servers, or the like. In some embodiments, the information handling devices 102 may be part of a data center used for data storage, data backup, data replication, disaster recovery, minoring, and/or the like. The information handling devices 102 may be located in geographically remote locations, in the same geographic location (e.g., the same data center), or some combination of both.

The information handling devices 102 may be configured to store data, backup data, replicate data, or the like. For example, the information handling devices 102 may be configured to perform synchronous or asynchronous data replication. In another example, information handling devices 102 may be configured as failover devices for one or more associated information handling devices 102. Moreover, the information handling devices 102 may include one or more storage volumes, storage devices, redundant array of independent disks ("RAID") devices or configurations, or the like, such as hard-disk drives, solid-state drives, flash memory devices, random-access memory ("RAM"), serial advanced technology attachment ("SATA") devices, tape devices, or the like. In some embodiments, the information handling devices 102 are in communication via one or more data networks 106, described below.

In one embodiment, the data replication module 104 determines a predicted match ratio between a current version of a file and a prior version of the file. In some embodiments, the predicted match ratio predicts a percentage of the current version of the file that matches the prior version of the file. The data replication module 104 performs a delta transfer of the current version of the file if the predicted match ratio is greater than a predetermined threshold. In various embodiments, the delta transfer transfers a portion of the current version of the file that has changed relative to the prior version of the file. The data replication module 104 may also perform a transfer of the current version of the file if the predicted match ratio is less than the predetermined threshold. In some embodiments, the transfer transfers the entire current version of the file. In this manner, the data replication module 104 may facilitate determining whether it is faster to do a delta transfer of the file or a whole transfer of the file. Ultimately, this may facilitate providing faster backups with a reduced amount of data transferred and/or reduced resource usage (e.g., processor, memory, data bandwidth, etc.).

As may be appreciated, the data replication module 104 may be used in any suitable data replication system 100. In certain embodiments, as described below with reference to FIGS. 2 and 3, the data replication module 104 includes multiple modules that perform the operations of the data replication module 104.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
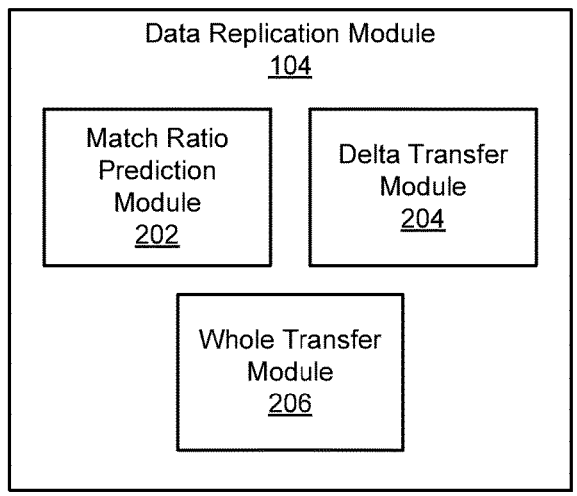
FIG. 2 is a schematic block diagram illustrating one embodiment of a module for data replication in accordance with one embodiment of the present invention.

FIG. 2 is a schematic block diagram illustrating one embodiment of a module 200 for data replication. In one embodiment, the module 200 includes an embodiment of a data replication module 104. The data replication module 104, in various embodiments, includes one or more of a match ratio prediction module 202, a delta transfer module 204, and a transfer module 206, which are described in more detail below.

In one embodiment, the match ratio prediction module 202 determines a predicted match ratio between a current version of a file and a prior version of the file. In some embodiments, the predicted match ratio predicts a percentage of the current version of the file that matches the prior version of the file. In certain embodiments, the predicted match ratio between the current version of the file and the prior version of the file is made by determining an average of actual prior match ratios that have been performed for the file. In such embodiments, the match ratio prediction module 202 may not need access to the current version of the file or the prior version of the file, but instead may access a match ratio history that includes prior match ratios that were actually performed. In some embodiments, the match ratio history of a file may be stored as an attribute or extended attribute of the file.

Table 1 provides data that may be used to explain how the match ratio prediction module 202 may use a match ratio history to determine a predicted match ratio.

TABLE 1

| File  | M[0]  | M[1]  | M[2] | M[3] | M[4] | SD    | D(SD) |
|-------|-------|-------|------|------|------|-------|-------|
| file1 | 30%   | 32%   | 24%  | 42%  | 42%  | 7.04  | 25.77 |
| file2 | 10%   | 74%   | 65%  | 8%   | 13%  | 29.17 | 12.50 |
| file3 | 34%   | 34%   | 34%  | 34%  | 34%  | 0     | 30    |
| file4 | 100%  | 100%  | 0%   | 0%   | 0%   | 48.99 | 0.6   |

In certain embodiments, the column headers (e.g., M[0], M[1], M[2], M[3], M[4], standard deviation ("SD"), D(SD)) in Table 1 may be new data attributes associated with each file in a file system. For example, the column headers in Table 1 may be stored together with a file, such as being part of the file. As another example, the column headers in Table 1 may be stored in a database or file that may be used to lookup the attributes of a file. In one embodiment, the column headers may be implemented in an extended attribute of a file system (e.g., XFS, etc.).

The column headers designated M (e.g., M[0], M[1], M[2], M[3], M[4]) represent the match ratio history of a file. In one embodiment, the match ratio history M includes five match ratios, while in other embodiments, the match ratio history M may include any suitable number of match ratios. Each match ratio indicates how closely the file being evaluated is the same as the prior version of the file being evaluated. For example, the match ratio M[0] for file1 is 30%. This means that when the match ratio M[0] was determined the version of file1 at that time was the same as (e.g., matched) 30% of a prior version of file1 (e.g., the most current backup copy of file1).

The match ratio history M may operate as a first in first out ("FIFO") system that contains n history of match ratios of a file. For example, M[0] may contain the match ratio of the last time a backup of the file was made and M[n−1] may contain the oldest match ratio of n times ago. Certain embodiments may include 1, 2, 4, 5, 10, 12, 40, 50, 100, 400, 1000, or more match ratios. In one embodiment, if each match ratio is 1 byte of data, 1000 match ratios may occupy approximately 1 kilobyte ("KB") of data. In certain embodiments, 1 KB of data may be small enough to be stored in an extended attribute.

The match ratio prediction module 202 may use the data in Table 1 for a particular file to predict a match ratio for that file. For example, the match ratio prediction module 202 may use an average of each match ratio of the match ratio history M of a file to predict the match ratio for the file, without actually calculating a match ratio. In one example, for file1 the average of the match ratios M is 34%. Accordingly, the match ratio prediction module 202 may predict that file1 has a match ratio of 34% (e.g., the predicted percentage of the current file1 that matches the last version of file1 backed up).

The delta transfer module 204, in one embodiment, performs a delta transfer of the current version of the file if the predicted match ratio is greater than a predetermined threshold. In certain embodiments, the delta transfer transfers a portion of the current version of the file that has changed relative to the prior version of the file. In some embodiments, the delta transfer module 204 may perform the delta transfer of the current version of the file if the predicted match ratio is equal to the predetermined threshold. As may be appreciated, the predetermined threshold may be any suitable value, such as 5%, 10%, 25%, 50%, 74%, 80%, 95%, or any other suitable value.

In certain embodiments, the predetermined threshold is determined so that if a match ratio of a file is>=the predetermined threshold then a delta transfer of the file is faster than a whole transfer of the file. In contrast, the predetermined threshold may also be determined so that if the match ratio of the file is<the predetermined threshold then a whole transfer of the file is faster than a delta transfer of the file. The predetermined threshold may be determined using various tests. For example, file pairs that have a match ratio of various percentages (e.g., 0%, 5%, 10% . . . 95%, 100%) may be made and each file pair may be replicated using both a delta transfer and a whole transfer. A minimum match ratio for which a delta transfer is faster than a whole transfer may be used as the predetermined threshold.

In various embodiments, a predetermined threshold may vary based on a file size. For example, one predetermined threshold may be for a specific file size range. As may be appreciated, large files may use more resources (e.g., time, processing power, etc.) for a delta transfer than small files. Accordingly, in one embodiment, for smaller files, a smaller predetermined threshold may be used, while for larger files, a larger predetermined threshold may be used.

A delta transfer may be used to transfer only delta blocks within a file, such as blocks of data from the file that have changed since the time of the last backup of the file. In some configurations, a backup of files is performed once a day. Accordingly, the delta transfer for a file may transfer blocks of data from the file that have changed since the file was backed up the prior day. In various embodiments, if a delta transfer is performed, a match ratio is determined as part of the delta transfer and the match ratio is stored in the match ratio history. For example, the match ratio may be determined while identifying parts of the file that have changed. In various embodiments, a SD of the match ratios in the match ratio history of the file may be determined if a delta transfer is used. Furthermore, a next check timestamp for the file may be determined based on the SD.

The transfer module 206, in one embodiment, performs a whole transfer of the current version of the file if the predicted match ratio is less than the predetermined threshold. In various embodiments, the transfer module 206 transfers the entire current version of the file. In some embodiments, the transfer module 206 may perform the transfer of the current version of the file if the predicted match ratio is equal to the predetermined threshold.

In certain embodiments, at least a portion of the match ratio prediction module 202, the delta transfer module 204, and the transfer module 206 include one or more of hardware and executable code. In such embodiments, the executable code may be stored on one or more computer readable storage media.

Figure 3:
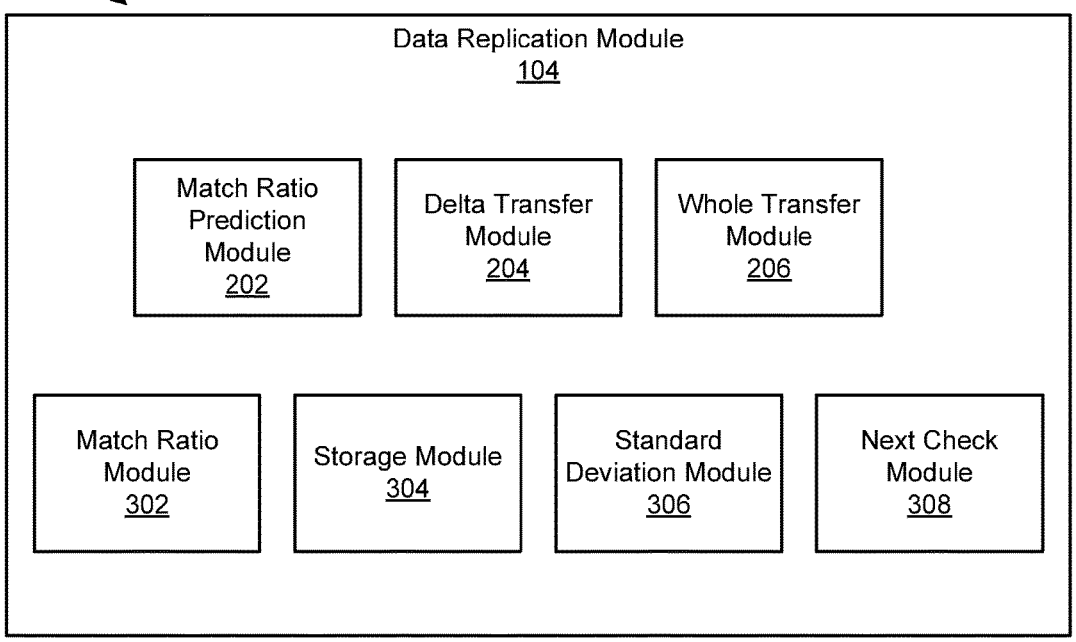
FIG. 3 is a schematic block diagram illustrating one embodiment of another module for data replication in accordance with one embodiment of the present invention.

FIG. 3 is a schematic block diagram illustrating one embodiment of another module 300 for data replication. In one embodiment, the module 300 includes an embodiment of a data replication module 104. The data replication module 104, in various embodiments, includes one or more of a match ratio prediction module 202, a delta transfer module 204, and a transfer module 206, which may be substantially similar to the match ratio prediction module 202, the delta transfer module 204, and the transfer module 206 described above. The data replication module 104 may also include one or more of a match ratio module 302, a storage module 304, a standard deviation ("SD") module 306, and a next check module 308, which are described in more detail below.

In one embodiment, the match ratio module 302 is used to determine at least one match ratio between a first version of the file and a second version of the file, wherein the at least one match ratio indicates a percentage of the first version of the file that matches the second version of the file. As may be appreciated, the first version of the file may be a current version of the file and the second version of the file may be a prior version of the file (e.g., a version of the file last backed up).

The storage module 304, in certain embodiments, is used to store at least one match ratio as part of a match ratio history of the file. In one embodiment, the storage module 304 may store the at least one match ratio with attributes of the file. In some embodiments, the storage module 304 may store the at least one match ratio in a separate file or database separate from the file to which the at least one match ration relates. Moreover, the storage module 304 may store the at least one match ratios using FIFO, or any other suitable method. As may be appreciated, the storage module 304 may use any suitable computer readable storage medium to store the at least one match ratio, such as different types of computer readable storage medium described herein.

In one embodiment, the SD module 306 is used to determine a SD of match ratios stored in the match ratio history M of a file if the match ratio history M of the file includes a predetermined number of match ratios. In one embodiment, the predetermined number of match ratios may be 5, while in another embodiment, the predetermined number of match ratios may be less than, or greater than 5, such as 3, 7, 10, or 35. The SD of the match ratios stored in the match ratio history M may be used to analyze how the match ratios for a particular file are distributed. For example, if the SD of a file is close to 0, the match ratio for this file may be assumed to not vary much so the match ratio may be accurately predicted. As the SD of a file gets larger, the match ratio may be more difficult to predict. In one example, as illustrated in Table 1, a file3 has a SD of 0; therefore, the match ratio may be easily predicted based on the match ratio history M. In contrast, as illustrated in Table 1, a file4 has a SD of 48.99; therefore, the match ratio may be more difficult to predict based on the match ratio history.

The next check module 308, in certain embodiments, determines a next check timestamp as a function of the SD. In some embodiments, the next check timestamp includes a timestamp after which a next match ratio of a file is to be determined. The timestamp after which the next match ratio is to be determined may be a time, a date, or some combination thereof. In one embodiment, the next check timestamp ("check_date") may be determined using the following formula: check_date=$D_{(SD)}$+current_timestamp, where $D_{(SD)}$=((50−SD)/50)*30, and the current_timestamp is the timestamp that exists when check_date is calculated. Using this formula, the 30 represents the maximum number of days desired until a next match ratio check is performed.

The function $D_{(SD)}$ returns the number of days until the next match ratio check will be performed. In other words, the next match ratio check will be processed after this number of days from the current_timestamp (e.g., the check_date). If the SD is very small, the match ratio is fairly constant and the next match ratio check may not be performed frequently. In contrast, if the SD is not small, the match ratio may change considerably and the next match ratio check may be performed frequently. In one example from Table 1, $D_{(SD)}$ for file1 is 25.77 which means that a match ratio will be checked after 25.77 days. This time period is near 30 because the SD for file1 is fairly low at 7.04. As another example from Table 1, $D_{(SD)}$ for file4 is 0.6 which means that a match ratio will be checked after 0.6 days. This time period is near 0 because the SD for file4 is high at 48.99.

Figure 4:
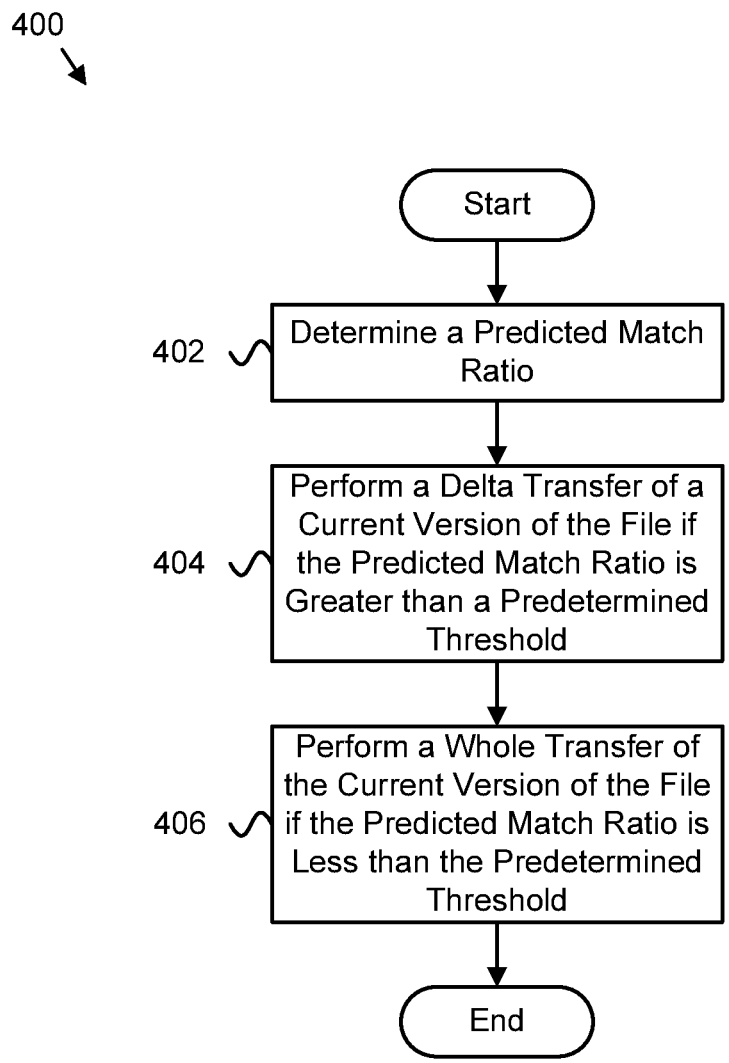
FIG. 4 is a schematic flow chart diagram illustrating one embodiment of a method for data replication in accordance with one embodiment of the present invention.

FIG. 4 is a schematic flow chart diagram illustrating one embodiment of a method 400 for data replication. As may be appreciated, the method 400 may be performed for each file being replicated as part of the data replication. In one embodiment, the method 400 begins and determines 402 a predicted match ratio between a current version of a file and a prior version of the file. In various embodiments, the predicted match ratio predicts a percentage of the current version of the file that matches the prior version of the file. In some embodiments, the match ratio prediction module 202 determines 402 the predicted match ratio between the current version of a file and the prior version of the file. In certain embodiments, the determining 402 the predicted match ratio between the current version of the file and the prior version of the file includes determining an average of one or more match ratios of a match ratio history.

The method 400 may perform 404 a delta transfer of the current version of the file if the predicted match ratio is greater than a predetermined threshold. In certain embodiments, the delta transfer transfers a portion of the current version of the file that has changed relative to the prior version of the file. In one embodiment, the delta transfer module 204 may perform 404 the delta transfer of the current version of the file if the predicted match ratio is greater than the predetermined threshold. In some embodiments, the method 400 may perform 404 the delta transfer of the current version of the file if the predicted match ratio is equal to the predetermined threshold. In various embodiments, performing 404 the delta transfer of the current version of the file if the predicted match ratio is greater than the predetermined threshold includes determining a match ratio between the current version of the file and the prior version of the file. In such embodiments, the match ration may indicate a percentage of the current version of the file that matches the prior version of the file.

The method 400 may perform 406 a transfer of the current version of the file if the predicted match ratio is less than the predetermined threshold, and the method 400 may end. In various embodiments, the transfer transfers the entire current version of the file. In some embodiments, the transfer module 206 may perform 406 the transfer of the current version of the file if the predicted match ratio is less than the predetermined threshold. In one embodiment, the method 400 may perform 406 the transfer of the current version of the file if the predicted match ratio is equal to the predetermined threshold.

Figure 5:
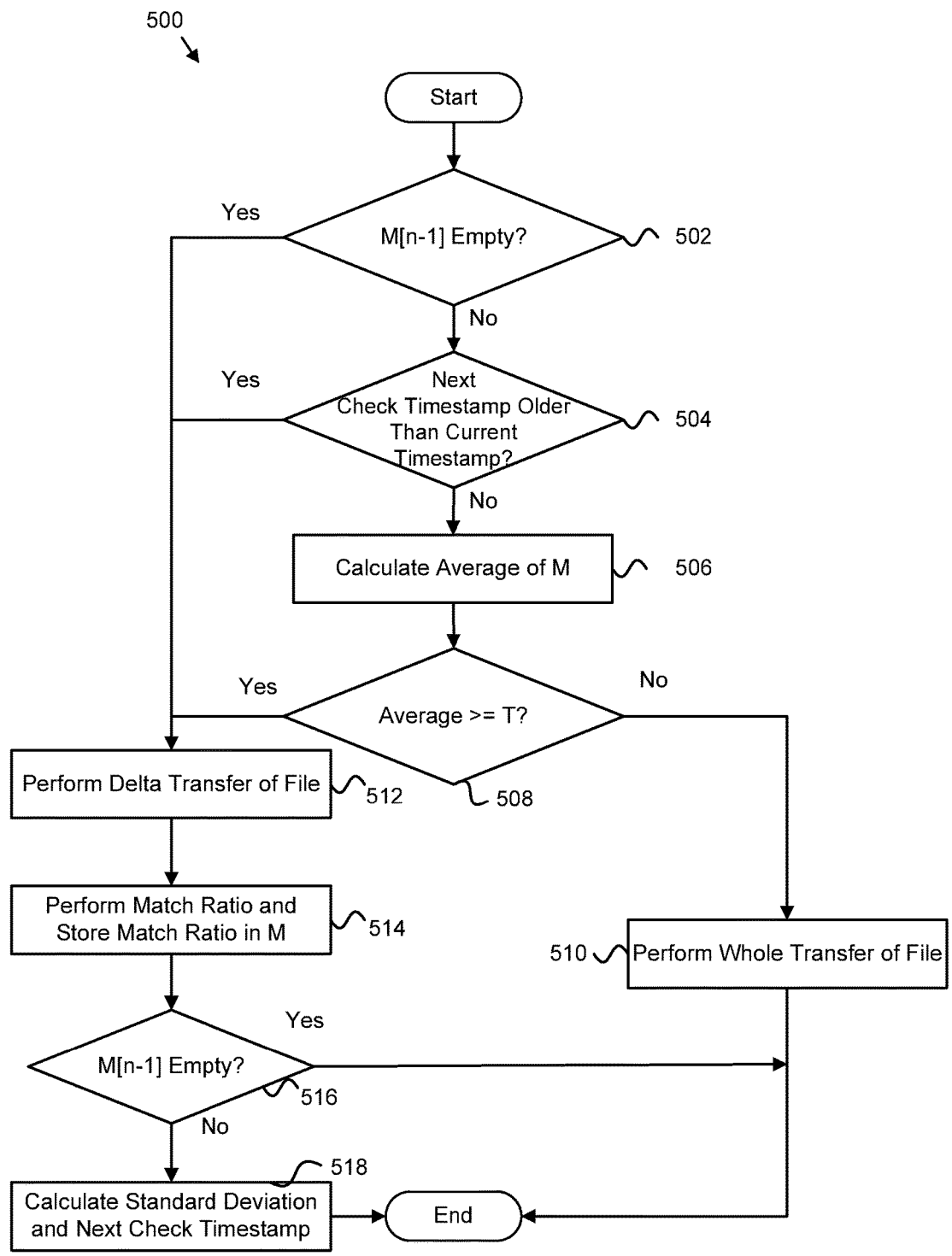
FIG. 5 is a schematic flow chart diagram illustrating one embodiment of another method for data replication in accordance with one embodiment of the present invention.

FIG. 5 is a schematic flow chart diagram illustrating one embodiment of another method 500 for data replication. As may be appreciated, the method 500 may be performed for each file being replicated as part of the data replication. In one embodiment, the method 500 begins and determines 502 whether a match ratio M[n−1] of a file is empty, where M is a match ratio history of the file that includes all stored match ratios for the file and n is a predetermined number of match ratios. In other words, the method 500 determines 502 if the match ratio history M of the file includes less than the predetermined number of match ratios n (e.g., the match ratio history M includes less than the predetermined number of match ratios n if M[n−1] is empty). If the match ratio M[n−1] of the file is not empty, the method 500 may determine 504 whether a next check timestamp of the file is older than a current timestamp. The next check timestamp of the file is a timestamp (e.g., date and/or time) after which a match ratio of the file will be determined. Therefore, the next check timestamp of the file is compared to the current timestamp (e.g., current date and/or time) to determine whether a match ratio of the file is to be determined.

If the next check timestamp of the file is not older than the current timestamp, the method 500 may determine a predicted match ratio between a current version of the file and a prior version of the file by calculating 506 an average of the match ratios in the match ratio history M. In some embodiments, the match ratio prediction module 202 may determine the predicted match ratio. The method 500 may determine 508 whether the average of the match ratios in the match ratio history M of the file is greater than or equal to a predetermined threshold.

If the average of the match ratios in the match ratio history M of the file is less than the predetermined threshold, the method 500 may perform 510 a transfer of the current version of the file, then the method 500 may end. As may be appreciated, the transfer transfers the entire version of the file. In some embodiments, the transfer module 206 may perform 510 the transfer of the current version of the file.

If the match ratio M[n−1] of the file is empty, the next check timestamp of the file is older than the current timestamp, or the average of the match ratios in the match ratio history M of the file is greater than or equal to the predetermined threshold, the method 500 may perform 512 a delta transfer of the current version of the file. In some embodiments, the delta transfer module 204 may perform 512 the delta transfer of the current version of the file.

The method 500 may perform 514 a match ratio and store the match ratio in the match ratio history M. The match ratio may be performed by comparing a first version of the file to a second version of the file. Moreover, the match ratio may indicate a percentage of the first version of the file that matches the second version of the file. In some embodiments, performing 514 the match ratio is done as part of performing 512 the delta transfer. In various embodiments, the match ratio module 302 may perform 514 the match ratio and/or the storage module 304 may store the match ratio in the match ratio history M.

The method 500 may determine 516 whether the match ratio M[n−1] of the file is empty. In other words, the method 500 may determine 516 if the match ratio history M of the file includes less than the predetermined number of match ratios n (e.g., the match ratio history M includes less than the predetermined number of match ratios n if M[n−1] is empty). If the match ratio M[n−1] of the file is empty, the method 500 may end.

If the match ratio M[n−1] of the file is not empty, the method 500 may calculate 518 (e.g., determine) a SD of the match ratios stored in the match ratio history M, the method 500 may calculate a next check timestamp as a function of the SD, and the method 500 may end. The next check timestamp includes a timestamp after which a next match ratio is to be determined. In one embodiment, the next check timestamp ("check_date") may be determined using the following formula: check_date=$D_{(SD)}$+current_timestamp, where $D_{(SD)}=((50-SD)/50)*30$, and the current_timestamp is the timestamp that exists when check_date is calculated. Using this formula, the 30 represents the maximum number of days desired until a next match ratio check is performed.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a match ratio prediction module that determines a predicted match ratio, wherein the predicted match ratio predicts a percentage of a current version of a file that matches a prior version of the file based on one or more match ratios of the file in a match ratio history without calculating a match ratio between the current version of the file and the prior version of the file;
   a delta transfer module that performs a delta transfer if the predicted match ratio is greater than a predetermined threshold, wherein the delta transfer transfers a portion of the current version of the file that has changed relative to the prior version of the file; and
   a transfer module that performs a transfer of the current version of the file if the predicted match ratio is less than the predetermined threshold;
   wherein at least a portion of the match ration prediction module, the delta transfer module, and the transfer module comprises one or more of hardware and executable code, the executable code being stored on one or more computer readable storage media.

2. The apparatus of claim 1, comprising a match ratio module that, in response to the transfer module performing the transfer of the current version of the file, determines at least one match ratio between a first version of the file and a second version of the file, wherein the at least one match ratio indicates a percentage of the first version of the file that matches the second version of the file.

3. The apparatus of claim 2, comprising a storage module that stores the at least one match ratio as part of the match ratio history of the file.

4. The apparatus of claim 3, comprising a standard deviation module that determines a standard deviation of match ratios stored in the match ratio history if the match ratio history comprises a predetermined number of match ratios.

5. The apparatus of claim 4, comprising a next check module that determines a next check timestamp as a function of the standard deviation, wherein the next check timestamp comprises a timestamp after which a next match ratio is to be determined.

6. A method for data replication, comprising:
   determining, by use of a processor, a predicted match ratio, wherein the predicted match ratio predicts a percentage of a current version of a file that matches a prior version of the file based on one or more match ratios of the file in a match ratio history without calculating a match ratio between the current version of the file and the prior version of the file;
   performing, by use of the processor, a delta transfer if the predicted match ratio is greater than a predetermined threshold, wherein the delta transfer transfers a portion of the current version of the file that has changed relative to the prior version of the file; and
   performing, by use of the processor, a transfer of the current version of the file if the predicted match ratio is less than the predetermined threshold.

7. The method of claim 6, comprising determining at least one match ratio between a first version of the file and a second version of the file in response to performing the transfer of the current version of the file, wherein the at least one match ratio indicates a percentage of the first version of the file that matches the second version of the file.

8. The method of claim 7, wherein determining the predicted match ratio between the current version of the file and the prior version of the file comprises determining an average of the at least one match ratio.

9. The method of claim 6, wherein performing the delta transfer if the predicted match ratio is greater than the predetermined threshold comprises performing the delta transfer of the current version of the file if the predicted match ratio is greater than or equal to the predetermined threshold.

10. The method of claim 6, wherein performing the transfer of the current version of the file if the predicted match ratio is less than the predetermined threshold comprises performing the transfer of the current version of the file if the predicted match ratio is less than or equal to the predetermined threshold.

11. The method of claim 6, wherein performing the delta transfer of the current version of the file if the predicted match ratio is greater than the predetermined threshold comprises determining a match ratio between the current version of the file and the prior version of the file, wherein the match ratio indicates a percentage of the current version of the file that matches the prior version of the file.

12. The method of claim 11, comprising storing the match ratio as part of the match ratio history of the file.

13. The method of claim 12, comprising determining whether the match ratio history comprises a predetermined number of match ratios.

14. The method of claim 13, comprising determining a standard deviation of match ratios stored in the match ratio history if the match ratio history comprises the predetermined number of match ratios.

15. The method of claim 14, comprising determining a next check timestamp as a function of the standard deviation, wherein the next check timestamp comprises a timestamp after which a next match ratio is to be determined.

16. The method of claim 6, wherein performing the delta transfer if the predicted match ratio is greater than the predetermined threshold comprises performing the delta transfer of the current version of the file if the predicted match ratio is greater than the predetermined threshold or if a match ratio history comprises less than a predetermined number of match ratios.

17. The method of claim 6, wherein performing the delta transfer if the predicted match ratio is greater than the predetermined threshold comprises performing delta transfer of the current version of the file if the predicted match ratio is greater than the predetermined threshold or if a current timestamp is beyond a next check timestamp.

18. A computer program product for data replication, the computer program product comprising a computer readable storage medium having program instructions embodied therewith, the program instructions executable by a processor to cause the processor to:
   determine a predicted match ratio, wherein the predicted match ratio predicts a percentage of a current version of a file that matches a prior version of the file based on one or more match ratios of the file in a match ratio history without calculating a match ratio between the current version of the file and the prior version of the file;
   perform a delta transfer if the predicted match ratio is greater than a predetermined threshold, wherein the delta transfer transfers a portion of the current version of the file that has changed relative to the prior version of the file; and
   perform a transfer of the current version of the file if the predicted match ratio is less than the predetermined threshold.

19. The computer program product of claim 18, wherein the program instructions are executable by the processor to cause the processor to determine at least one match ratio between a first version of the file and a second version of the file in response to performing the transfer of the current version of the file, wherein the at least one match ratio indicates a percentage of the first version of the file that matches the second version of the file.

20. The computer program product of claim 18, wherein the program instructions are executable by the processor to cause the processor to determine a standard deviation of match ratios stored in the match ratio history if the match ratio history comprises a predetermined number of match ratios.

* * * * *